United States Patent
Kwon et al.

(10) Patent No.: US 10,768,754 B2
(45) Date of Patent: Sep. 8, 2020

(54) TOUCH INPUT DEVICE, VEHICLE INCLUDING SAME, AND MANUFACTURING METHOD THEREFOR

(71) Applicants: HYUNDAI MOTOR COMPANY, Seoul (KR); KIA MOTORS CORPORATION, Seoul (KR)

(72) Inventors: Gi Deok Kwon, Seoul (KR); Jong Bok Lee, Suwon-si (KR)

(73) Assignees: HYUNDAI MOTOR COMPANY, Seoul (KR); KAI MOTORS CORPORATION, Seoul (KR)

( * ) Notice: Subject to any disclaimer, the term of this patent is extended or adjusted under 35 U.S.C. 154(b) by 0 days.

(21) Appl. No.: 15/777,101

(22) PCT Filed: Nov. 18, 2016

(86) PCT No.: PCT/KR2016/013372
§ 371 (c)(1),
(2) Date: May 17, 2018

(87) PCT Pub. No.: WO2017/086751
PCT Pub. Date: May 26, 2017

(65) Prior Publication Data
US 2018/0335867 A1 Nov. 22, 2018

(30) Foreign Application Priority Data
Nov. 19, 2015 (KR) .................. 10-2015-0162762

(51) Int. Cl.
*G06F 3/044* (2006.01)
*B60K 20/02* (2006.01)

(52) U.S. Cl.
CPC .............. *G06F 3/044* (2013.01); *B60K 20/02* (2013.01); *G06F 2203/04103* (2013.01); *G06F 2203/04111* (2013.01)

(58) Field of Classification Search
CPC .......... G06F 3/044; G06F 2203/04103; G06F 2203/04111; B60K 20/02
See application file for complete search history.

(56) References Cited

U.S. PATENT DOCUMENTS

2005/0092359 A1* 5/2005 Uchida ................ H01G 9/2022
136/256
2008/0122796 A1 5/2008 Jobs et al.
(Continued)

FOREIGN PATENT DOCUMENTS

| EP | 2544080 A2 | 1/2013 |
| JP | 2015-035380 A | 2/2015 |

(Continued)

OTHER PUBLICATIONS

Extended European Search Report dated Apr. 26, 2019 issued in European Patent Application No. 16866703.8.
(Continued)

*Primary Examiner* — Stephen G Sherman
(74) *Attorney, Agent, or Firm* — Morgan, Lewis & Bockius LLP

(57) ABSTRACT

Disclosed is a touch input device capable of inputting a touch signal, a vehicle having the same, and a manufacturing method thereof. A touch input device comprises: a touch portion including a concave portion and receiving a touch signal of a user; a base integrally combined with the touch portion or disposed at a lower side of the touch portion and having pattern grooves in an area corresponding to the touch portion; and sensing patterns having a conductive material and arranged on the pattern grooves. The sensing patterns located at a lower side of the concave portion have a resistance smaller than a resistance of the sensing patterns located at an outer side of the concave portion.

7 Claims, 11 Drawing Sheets

(56) References Cited

U.S. PATENT DOCUMENTS

| | | | |
|---|---|---|---|
| 2008/0138589 A1* | 6/2008 | Wakabayashi | H01H 13/83 428/195.1 |
| 2011/0109541 A1* | 5/2011 | Kitagawa | B60K 35/00 345/156 |
| 2012/0075239 A1 | 3/2012 | Azumi et al. | |
| 2014/0158507 A1 | 6/2014 | Park et al. | |
| 2014/0342131 A1* | 11/2014 | Lee | G06F 3/041 428/179 |
| 2015/0309600 A1 | 10/2015 | Ramakrishnan et al. | |
| 2015/0370284 A1* | 12/2015 | Bauer | G06F 3/041 345/174 |

FOREIGN PATENT DOCUMENTS

| | | |
|---|---|---|
| JP | 2015-049601 A | 3/2015 |
| JP | 3198960 U | 7/2015 |
| KR | 10-2000-0068595 A | 11/2000 |
| KR | 10-2001-0040872 A | 5/2001 |
| KR | 2002-0079852 A | 10/2002 |
| KR | 10-2004-0021614 A | 3/2004 |
| KR | 10-0681157 B1 | 2/2007 |
| KR | 10-2008-0110477 A | 12/2008 |
| KR | 10-2010-0031204 A | 3/2010 |
| KR | 10-1114873 B1 | 2/2012 |
| KR | 10-1202552 B1 | 11/2012 |
| KR | 10-2015-0026961 A | 3/2015 |
| WO | 2015/146277 A1 | 10/2015 |

OTHER PUBLICATIONS

Korean Notice of Allowance issued in Application No. 10-2015-0162762 dated Mar. 31, 2017, with English translation.
International Search Report issued in Application No. PCT/KR201610/3372 dated Feb. 15, 2017, with English translation.

* cited by examiner

TOUCH INPUT DEVICE, VEHICLE INCLUDING SAME, AND MANUFACTURING METHOD THEREFOR

This application is a national stage of International Application No. PCT/KR2016/013372, filed Nov. 18, 2016, which claims the benefit of Korean Application No. 10-2015-0162762, filed on Nov. 19, 2015, the disclosures of which are incorporated in their entirety by reference herein.

TECHNICAL FIELD

The present disclosure relates to a touch input device, a vehicle having a touch input device, and a manufacturing method thereof, and more particularly, to a touch input device capable of inputting a touch signal, a vehicle having a touch input device, and a manufacturing method thereof.

BACKGROUND ART

Generally, various electronic devices are being developed through the development of electronic communication technology, and these electronic devices are increasingly emphasizing splendors of a design along with convenience of the user's operation. What is emphasized in this trend is the diversification of input devices represented by keyboards or keypads.

Input devices are used in various types of display systems that provide information to users, such as portable terminals, notebooks, smart phones, smart pads, smart TVs, and the like. Recently, a method of inputting a command signal by using a touch has been used in addition to a method of inputting using an operation key, a dial, or the like in conjunction with the development of electronic devices.

The touch input device, which is one of the input devices constituting an interface between the information communication devices using various displays and the user, enables an interface between an information communication device and a user by allowing the user to directly touch or approach the touch pad or the touch screen by using a finger or an input tool such as a touch pen.

The touch input device is utilized by various devices such as an automated teller machine (ATM), a personal digital assistant (PDA), and a mobile phone because the touch input device may be easily used by anyone of all ages, just by touching a finger or an input tool such as a touch pen. It is also widely used in many fields such as banks, government offices, sightseeing and traffic information.

Recently, efforts have been made to apply touch input devices to health or medical products and vehicles. In particular, the use of the touch panel is increasing because it may be used together with the touch screen or may be used independently in the display system. Recently, a function of inputting a gesture in addition to a function of moving a point by using a touch has been developed. In the case of a touch input device capable of inputting a gesture, efforts to improve the recognition rate of a gesture continue.

As a method of implementing a touch input device capable of touch operation, a resistance method, an electrostatic capacitance method, a surface ultrasonic method, and a transmitter method are used. Among them, as a touch input device using the electrostatic capacitance method, there is a type in which electrode patterns are formed in a direction crossing each other and a change in electrostatic capacitance between electrodes is detected when an input means such as a finger touches the touch input device to detect an input position. Alternatively, there is a type in which the equal potential with the inphase is applied to both ends of a transparent conductive film and a weak current flowing when the input means such as a finger touches or is close to the touch input device to form a capacitor is detected to detect an input position.

In general, the touch input device is composed of a two-panel laminated structure in which a first panel and a second panel are bonded by using an adhesive, wherein the first panel includes first sensing patterns arranged in a first direction (e.g., x-axis direction) on the first substrate and a plurality of first metal patterns electrically connecting sensor circuits for calculating the position of the first sensing patterns, and the second panel includes second sensing patterns arranged in a second direction (e.g., y-axis direction) on the second substrate and a plurality of second metal patterns electrically connecting sensor circuits for calculating the positions of the second sensing patterns.

In addition, Korean Laid-Open Patent Application No. 10-2008-0110477 discloses a one-piece type two-layer electrostatic capacitive touch panel.

However, the conventional electrostatic capacitive touch pad is only formed on a gentle curved surface, and there is no technology for forming a touch pad on a complex curved surface.

DISCLOSURE OF INVENTION

Technical Problem

An object of the present disclosure is to provide a touch input device capable of performing touch input without malfunction even in a complicated shape and a manufacturing method thereof.

Technical Solution

According to an aspect of the present disclosure, a touch input device comprises: a touch portion configured to receive a touch signal of a user and having a concave portion; a base integrally combined with the touch portion or disposed at a lower side of the touch portion, and having pattern grooves in an area corresponding to the touch portion; and sensing patterns comprising a conductive material and arranged on the pattern grooves, wherein the sensing patterns located at a lower side of the concave portion have a resistance smaller than a resistance of the sensing patterns located at an outer side of the concave portion.

The sensing patterns located at a lower side of the concave portion may have a vertical cross-sectional width greater than a vertical cross-sectional width of the sensing patterns located at an outer side of the concave portion.

The base may include a metal complex.

The base may comprise a resin including at least one of polycarbonate (PC), polyamide (PA), and acrylonitrile-butadiene-styrene copolymer (ABS), and a metal oxide including at least one of Mg, Cr, Cu, Ba, Fe, Ti, and Al.

The touch input device may further comprise a parent material on which the touch portion is formed, and the base may be provided by being coated on a bottom surface of the parent material.

The parent material may be any one of resin, glass, and leather.

The base may comprise a first base disposed at a lower side of the parent material and a second base disposed at a lower side of the first base, and the pattern grooves and the sensing patterns may include first pattern grooves and first sensing patterns formed on one surface of the first base, and second pattern grooves and second sensing patterns formed on one surface of the second base.

According to another aspect of the present disclosure, a method of manufacturing a touch input device comprises: preparing a parent material comprising a concave portion; preparing a base comprising a metal complex at a lower side of the parent material; forming pattern grooves by irradiating a laser to a touch portion of the base, wherein the pattern grooves in an area in which the concave portion is located and the pattern grooves in an area at an outer side of the concave portion are formed to be different from each other in at least one of the width and depth; and forming sensing patterns including a conductive material in the pattern grooves through a plating process or a deposition process.

The pattern grooves in the area in which the concave portion is located may have at least one of a width and a depth larger than at least one of a width and a depth of the pattern grooves in the outer area of the concave portion.

Metal seeds may be exposed to inner surfaces of the pattern grooves in the irradiating of the laser on one surface of the base, and a conductive material may be attached to the metal seeds in the plating or depositing of the sensing patterns.

The forming of the pattern grooves may comprise forming first pattern grooves and second pattern grooves disposed apart from the first pattern grooves, and the forming of the sensing patterns may comprise forming first sensing patterns to be plated or deposited on the first pattern grooves and second sensing patterns to be plated or deposited on the second pattern grooves, the method may further comprising determining whether or not the first and second sensing patterns are able to be used as a sensor by providing current to the first and second sensing patterns and inspecting a change in mutual capacitance between the first and second sensing patterns.

According to another aspect of the present disclosure, a vehicle comprises a touch input device.

The touch input device may be installed in a centralized operating system of a gear box.

Advantageous Effects

The touch input device according to the embodiments of the present disclosure allows for a user to perform a touch input at a desired point by increasing the resistance of the recessed portion even when a touch surface having a complicated shape including a concave portion is provided.

Since the touch input device according to the embodiments of the present disclosure is manufactured using the Laser Directing Structure (LDS) method, the manufacturing process can be simplified and the process cost can be reduced.

Further, it is possible to secure from vibration and impact and improve durability by not using an adhesion process to form sensing patterns on the base.

Since the base on which the touch surface is provided can be extended to the portion connecting the integrated circuit and integrally formed, the manufacturing process can be simplified and the process cost can be reduced.

In addition, since the base can be formed by the injection method, the manufacturing cost can be reduced.

Moreover, the bonding portions used for electrically connecting the sensing patterns to the integrated circuit can be minimized, thereby improving durability against high temperature and vibration.

Even when the touch surface is provided with multiple curved surfaces, the sensing patterns can be formed.

The reliability can be improved even when the product is used in a high-temperature environment by being produced in a high-temperature condition using a laser.

In addition, even when various sizes of fabrication are required, it is possible to process without modification of the manufacturing equipment, thereby reducing the process cost and shortening the fabrication schedule.

BRIEF DESCRIPTION OF DRAWINGS

FIGS. 5 to 11 schematically illustrate a method of manufacturing the touch input device according to the first embodiment of the present disclosure; wherein FIG. 5 shows a process of preparing a first base, FIG. 6 shows a process of forming first pattern grooves, FIG. 7 shows a process of forming first sensing patterns, FIG. 8 shows a process of stacking a second base, FIG. 9 shows a process of forming second pattern grooves, FIG. 10 shows a process of forming second sensing patterns, and FIG. 11 shows a process of stacking a painting layer.

FIGS. 17 to 24 schematically illustrate a method of manufacturing the touch input device according to the fourth embodiment of the present disclosure; wherein FIG. 17 shows a process of preparing different kinds of parent materials, FIG. 18 shows a process of stacking a first base, FIG. 19 shows a process of forming first pattern grooves, FIG. 20 shows a process of forming first sensing patterns, FIG. 21 shows a process of stacking a second base, FIG. 22 shows a process of forming second pattern grooves, FIG. 23 shows a process of forming second sensing patterns, and FIG. 24 shows a process of stacking a painting layer.

MODE FOR INVENTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

A touch input device may be provided in the form of a touch pad or in the form of a touch panel. The touch input device is a means for receiving a signal by contact (or proximity) of an input means such as a finger of a user and grasping a position in contact (or proximity).

The touch pad is mainly used as an input device of a notebook or the like, and recently, it is used as an input device of a vehicle. The touch panel is a kind of interactive graphic input device in which a user can directly specify a position while viewing the screen.

The structure of a touch input device 100 will be described with reference to FIG. 1.

Figure 1:
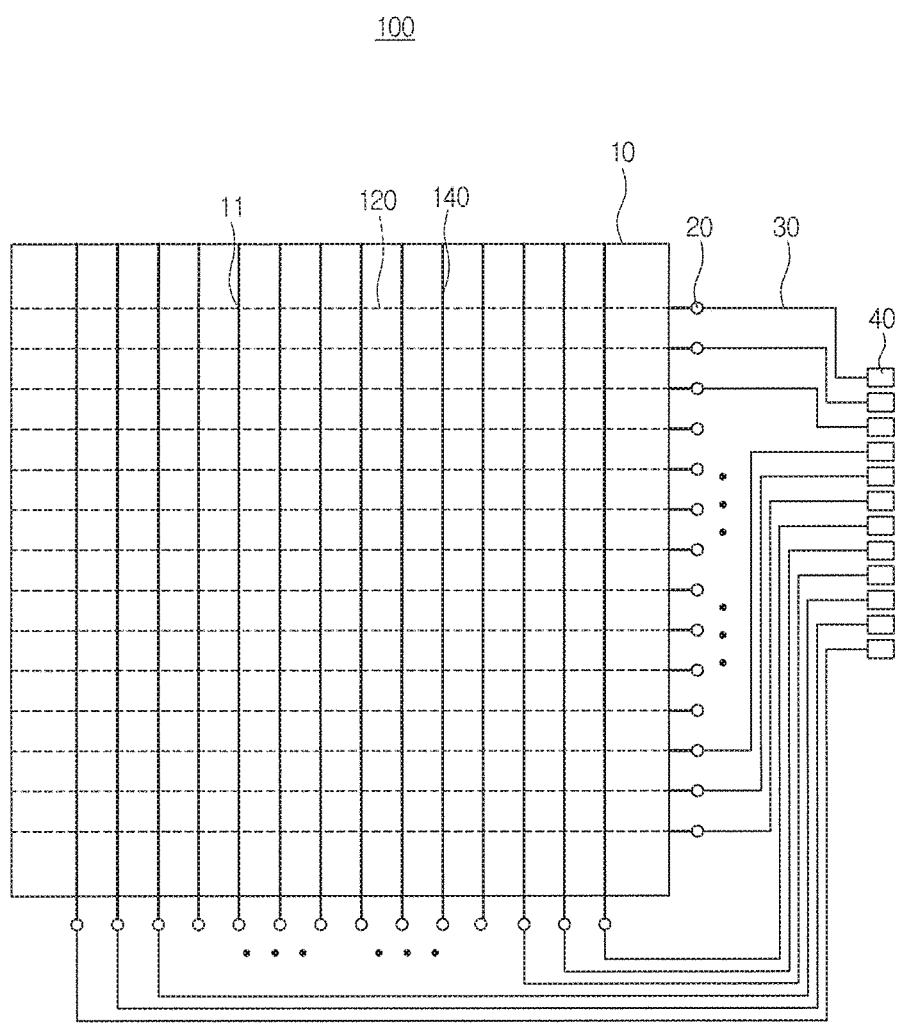
FIG. 1 is a structural diagram showing an electrode arrangement of a touch input device according to a first embodiment of the present disclosure.

FIG. 1, which is a structural diagram showing an electrode arrangement of a touch input device 100 according to a first embodiment of the present disclosure, is a plan view for showing operating methods of the touch input device 100 in an easy-to-understand manner, which is different from what is actually shown in the structure of the touch input device 100. The touch input device 100 comprises a touch portion 10 capable of contacting a user's input means (e.g., a finger or a touch pen), first and second sensing patterns 120 and 140 formed integrally with the touch portion 10 or disposed under the touch portion 10, wirings 30 and connection pads 40 connected to the sensing patterns 120 and 140.

The first sensing patterns 120 and the second sensing patterns 140 may have a predetermined pattern so as to be able to detect a change in capacitance when the user touches the touch input device 100 with a finger, a touch pen, or the like. Here, the contact (the touch) may be defined to include both direct contact and indirect contact. That is, a direct contact indicates a case where an object touches the touch input device 100, and an indirect contact indicates a state in which an object does not touch the touch input device 100 but approaches within a range where the sensing pattern is able to sense the object.

The first sensing patterns 120 may be arranged in a predetermined section in a first direction (traverse direction in the drawing), and the second sensing patterns 140 may be arranged in a predetermined section in a direction (longitudinal direction in the drawing) different from the first direction. The first sensing patterns 120 and the second sensing patterns 140 are provided in different layers to each other and form intersections 11. The first sensing patterns 120 and the second sensing patterns 140 may not be in direct contact with each other at the intersections 11 but may overlap each other with the insulating portion interposed therebetween.

The intersections 11 may determine the resolution of the touch portion 10 and may be recognized as coordinates. That is, it is possible to distinguish the case where the input means is in contact with an intersection 11 and the case where the input means is in contact with an intersection 11 adjacent to the intersection 11, and it is possible to determine at which intersection 11 the input means has contacted. Therefore, as the number of intersections 11 is increased in the same area, the resolution of the touch portion 10 increases.

One ends of each of the first and second sensing patterns 120 and 140 may be connected to the wirings 30 formed of metal wirings or the like. The connection pads 40 are provided at one ends of the wirings 30 and each wiring 30 may be connected to a circuit board (not shown) through each connection pad 40.

Connection portions 20 may be provided at one end portions of the first and second sensing patterns 120 and 140. Since the connection portions 20 are wider than widths of the first and second sensing patterns 120 and 140, it is easy to electrically connect the wirings 30. The connection portions 20 and the wirings 30 may be bonded by a conductive adhesive agent (for example, solder).

The wirings 30 transmit a sensing signal of the sensing patterns 120 and 140 to the circuit board through the connection pads 40. The wirings 30 and the connection pads 40 may be formed of a conductive material.

When the input means touches one region of the touch portion 10, the capacitance of the intersection 11 decreases, information about the capacitance reaches the circuit board operating as a control unit through the wiring 30 and the connection pad 40, and the control unit may determine at which position the input means has contacted. In addition, it may be constituted to reduce the capacitance when the input means approaches one region of the touch portion 10. In this case, the control unit may determine at which position the input means is approaching.

Figure 2:
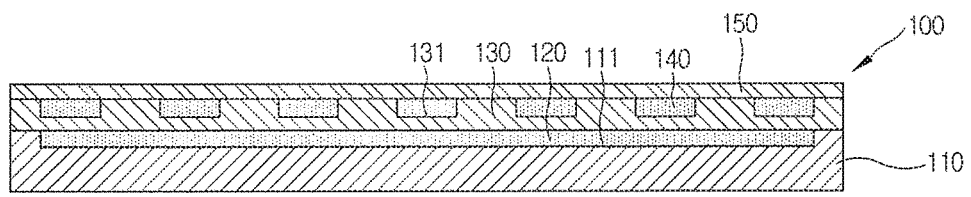
FIG. 2 is a cross-sectional view illustrating the touch input device according to the first embodiment of the present disclosure.
Figure 3:
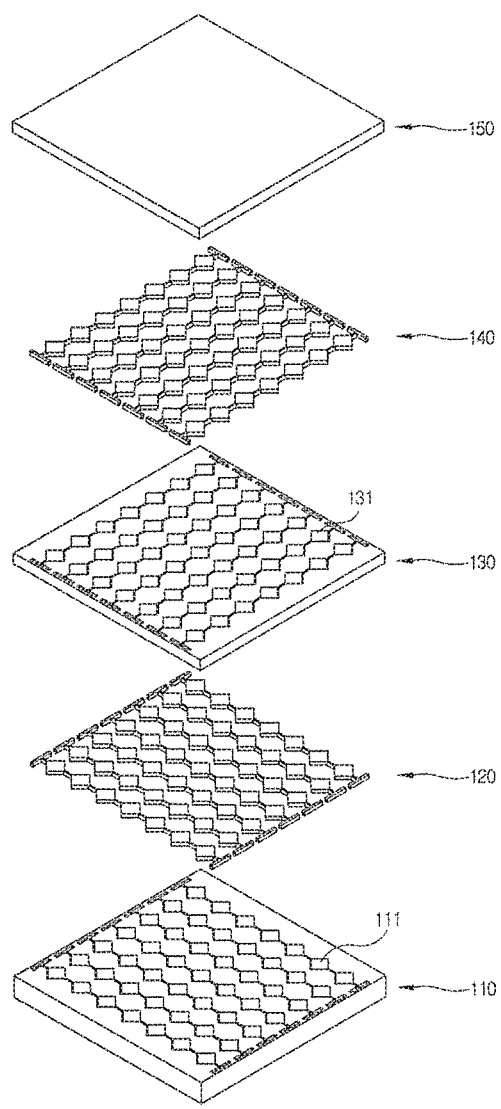
FIG. 3 is an exploded perspective view illustrating the touch input device according to the first embodiment of the present disclosure.

FIG. 2 is a cross-sectional view illustrating the touch input device 100 according to the first embodiment of the present disclosure, and FIG. 3 is an exploded perspective view illustrating the touch input device 100 according to the first embodiment of the present disclosure.

The touch input device 100 may comprise a first base 110 including first pattern grooves 111, first sensing patterns 120 plated on the first pattern grooves 111, a second base 130 that is stacked on the first base 110 and includes second pattern grooves 131, second sensing patterns 140 plated on the second pattern grooves 131, and a painting layer 150 for insulating the second sensing patterns 140.

The first sensing patterns 120 and the second sensing patterns 140 may be formed on the first base 110 and the second base 130 using a laser directing structure (LDS) method. Here, the LDS method refers to a method of forming a support material by a material including a non-conductive and chemically stable metal complex, exposing a metal seed by disintegrating a chemical bond of a metal complex by exposing a part of the support material to a laser such as an UV (Ultra Violet) laser or an excimer laser, and then metalizing the support material to form a conductive structure on the laser-exposed portion of the support material. Such an LDS method is well-known.

The first and second sensing patterns 120 and 140 may be formed of a conductive material, for example, a metal. Copper (Cu) may be used among metals in consideration of conductivity and economic efficiency. However, the first and second sensing patterns 120 and 140 may be formed of metal such as gold (Au) in addition to copper.

The first sensing patterns 120 may extend in a first direction (traverse direction in the drawing), and each pattern may be arranged in rows. In addition, the second sensing patterns 140 may extend in a second direction (longitudinal direction in the drawing) perpendicular to the first direction, and each pattern may be arranged in rows. However, the angle of intersection between the first sensing patterns 120 and the second sensing patterns 140 is not limited to perpendicular.

Further, the first sensing patterns 120 and the second sensing patterns 140 may include a shape in which rhombic patterns are continuously connected. However, the shape of the pattern is not limited to the rhombus, and various shapes may be employed as needed. Adjacent rhombic patterns may be connected by a connecting portion, and the connecting portion may be provided by a bridge type connecting the two patterns.

The first base 110 and the second base 130 may include a metal complex. As an example, the first base 110 and the second base 130 may be a complex comprising a resin and a metal oxide. The resin may include at least one of PC (Polycarbonate), PA (Polyamide), and ABS (acrylonitrile-butadiene-styrene copolymer), and the metal oxide may include at least one of Mg, Cr, Cu, Ba, Fe, Ti, and Al.

The first pattern grooves 111 for receiving the first sensing patterns 120 are formed on one surface of the first base 110, and the second pattern grooves 131 for receiving the second sensing patterns 140 are formed on one surface of the second base 130. That is, the first and second sensing patterns 120 and 140 may be provided in the first and second pattern grooves 11 and 131, respectively.

The first and second pattern grooves 111 and 131 may be formed by irradiating a laser on one surface of the first and second bases 110 and 130. Here, a portion of the first and second bases 110 and 130 are converted to metal by the heat generated when the grooves are formed, and the portion converted to the metal forms the metal seed in the first and second pattern grooves 111 and 131.

The first and second sensing patterns 120 and 140 are formed by plating on the first and second pattern grooves 111 and 131. The plating process on the metal seed may use a generally known plating technique, and thus, a detailed description thereof will be omitted.

Alternatively, the first and second sensing patterns 120 and 140 may be formed by a deposition process or by a combination of a plating process and a deposition process. Hereinafter, descriptions will be made on the basis that the first and second sensing patterns 120 and 140 are formed by a plating process.

The first and second sensing patterns 120 and 140 may include copper (Cu) plating, and nickel (Ni) may be plated on the copper plating to prevent oxidation. In a case that gold (Au) plating is used, the conductivity may be improved.

The first and second bases 110 and 130 may be formed by injecting a metal complex, or may be formed by injecting another material (for example, plastic or glass) and coating a metal complex thereon.

Next, a method of manufacturing the touch input device 100 according to the first embodiment of the present disclosure will be described with reference to FIGS. 4 to 11.

Figure 4:
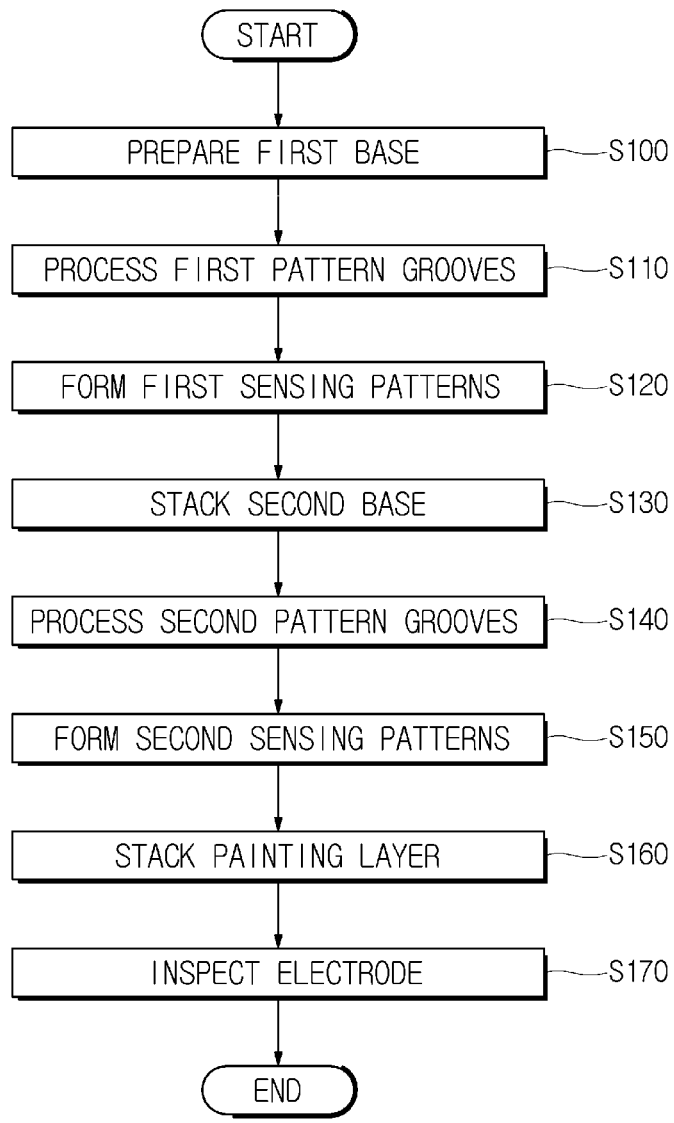
FIG. 4 is a flowchart illustrating a method of manufacturing the touch input device according to the first embodiment of the present disclosure.

FIG. 4 is a flowchart showing a manufacturing method of the touch input device 100 according to the first embodiment of the present disclosure, and FIGS. 5 to 11 show a manufacturing method of the touch input device 100 according to the first embodiment of the present disclosure.

Figure 5:
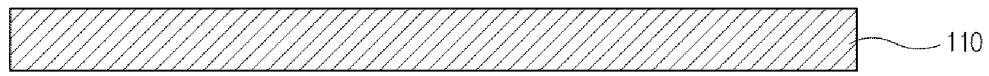

FIG. 5 is a view showing a process (S100) of preparing the first base 110.

The first base 110 may include a metal complex. For example, the first base 110 may be a complex comprising a resin and a metal oxide. Here, the resin may include at least one of PC (Polycarbonate), PA (Polyamide), and ABS (acrylonitrile-butadiene-styrene copolymer), and the metal oxide may include at least one of Mg, Cr, Cu, Ba, Fe, Ti, and Al.

The first base 110 may be formed using an injection method. The first base 110 may also be formed by injecting a metal complex, or may be formed by coating a metal complex on one surface of a parent material made of other materials such as plastic or glass.

Further, the first base 110 may have a curved surface on one surface. For example, a curved surface may be formed on one surface of the first base 110 to be depressed into a part of a spherical surface.

Figure 6:

FIG. 6 is a view showing a process (S110) of processing the first pattern grooves 111.

The first pattern grooves 111 are formed by irradiating a laser such as an ultraviolet (UV) laser or an excimer laser on one surface of the first base 110. At this time, the heat generated as the grooves are formed disintegrates the chemical bonds of the metal complex to convert them to metal, and forms a metal seed in the first pattern grooves 111.

The first pattern grooves 111 may be formed on one surface of the first base 110, which is provided with a curved surface. Since the grooves are formed by irradiating the laser, various patterns may be formed irrespective of the surface shape of the first base 110.

Figure 7:
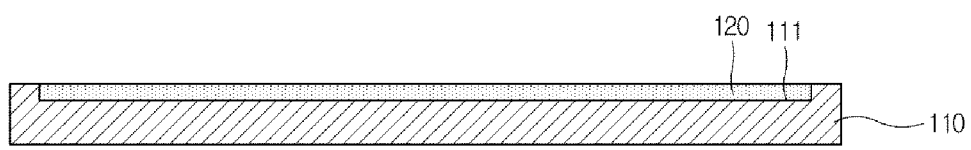

FIG. 7 is a view illustrating a process (S120) of forming the first sensing patterns 120.

The first sensing patterns 120 may be formed by metallizing the first pattern grooves 111 in which the metal seed is exposed. For example, the first sensing patterns 120 include copper plated on the first pattern grooves 111. Further, nickel may be plated on the copper plating to prevent oxidation.

Figure 8:
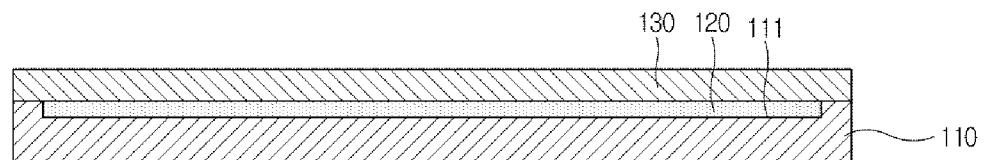
Figure 9:
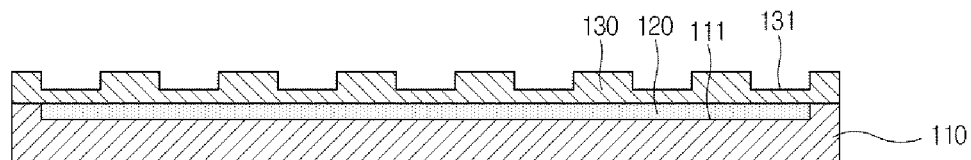
Figure 10:
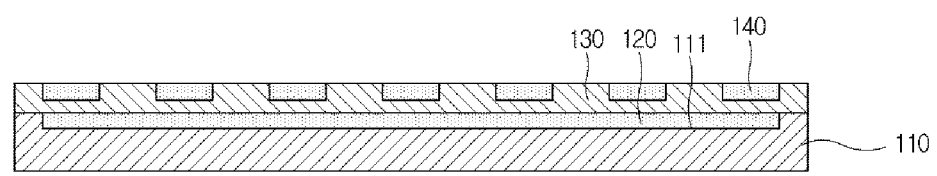

FIG. 8 is a view showing a process (S130) of stacking the second base 130, FIG. 9 is a view showing a process (S140) of processing the second pattern grooves 131, and FIG. 10 is a view showing a process (S150) of forming the second sensing patterns 140.

The second base 130 may be formed of a metal complex and coated on the first base 110. In addition, the processes shown in FIGS. 8 to 10 may be applied to the description of FIGS. 5 to 7, so that redundant description will be omitted.

Figure 11:
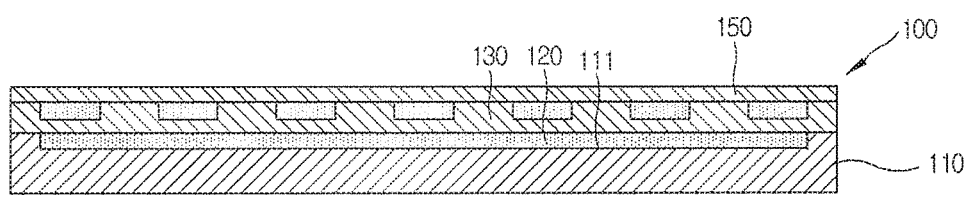

FIG. 11 is a view showing a process (S160) of stacking the painting layer 150.

The painting layer 150 may be coated on the second base 130 to protect the second sensing patterns 140 from external shocks or contaminants. The painting layer 150 may constitute a touch surface of the touch portion 10.

The painting layer 150 may be formed by UV painting or UV coating using an ultraviolet screening agent.

Although not shown in the drawing, the manufacturing method may further include an inspecting process (S170) for inspecting whether the touch input device 100 produced by the processes of FIGS. 5 to 11 operates properly.

The inspection process S170 comprises supplying current to the first and second sensing patterns 120 and 140, and inspecting a change in mutual capacitance between the first and second sensing patterns to determine whether or not the sensor is able to be used as a sensor. This is because in order for the touch input device 100 to function as a product, mutual capacitance between the first and second sensing patterns 120 and 140 is changed when the input means contacts the touch portion 10, the position where the input means is touched needs to be detected by detecting such a change.

The inspection process S170 may be performed before the process S160 of stacking the painting layer 150. This is because it may happen that the second detection patterns 140 needs to be repaired by receiving the non-conformity determination in the inspection process S170.

Figure 12:
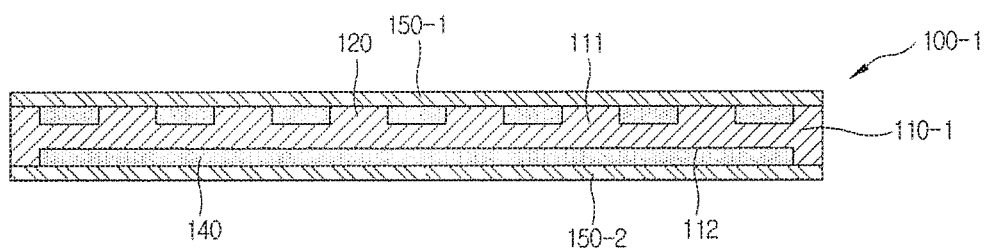
FIG. 12 is a cross-sectional view showing a touch input device according to a second embodiment of the present disclosure.

FIG. 12 is a cross-sectional view showing a touch input device 100-1 according to a second embodiment of the present disclosure.

Figure 13:
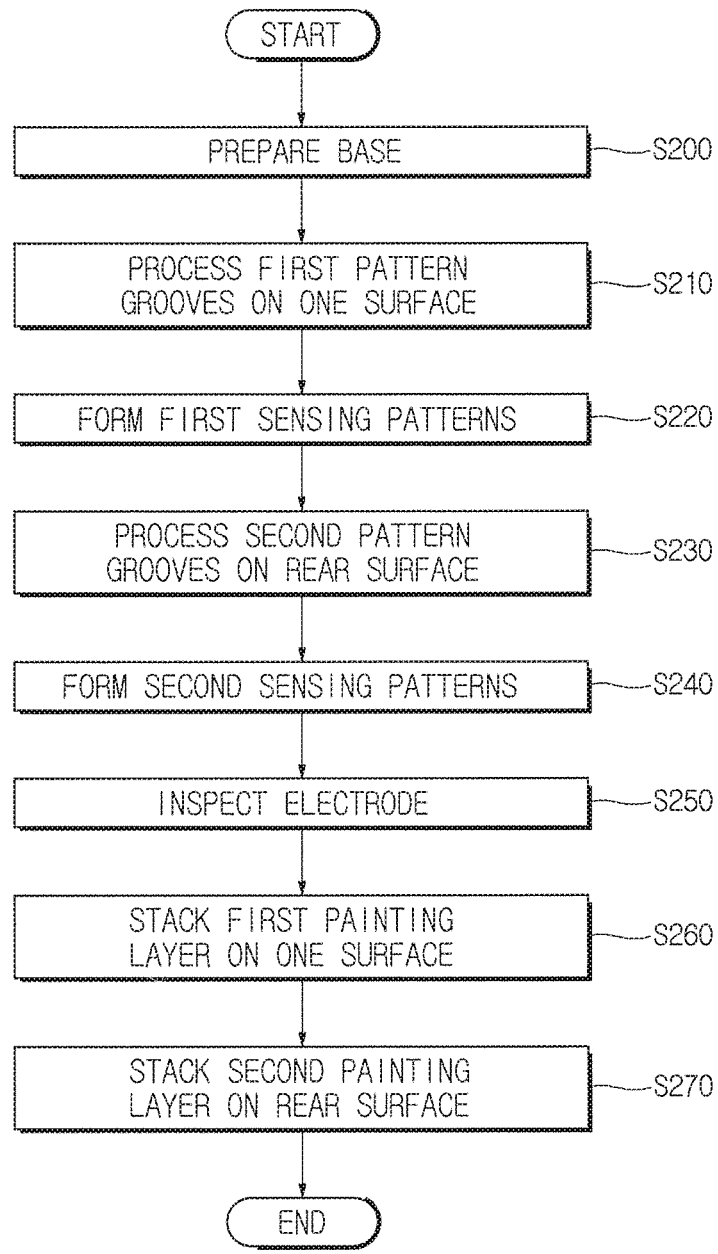
FIG. 13 is a flowchart illustrating a method of manufacturing the touch input device according to the second embodiment of the present disclosure.

Referring to FIG. 13, the touch input device 100-1 according to the second embodiment of the present disclosure comprises a base 110-1, first pattern grooves 111 formed on one surface of the base 110-1, second pattern grooves 112 formed on the rear surface of the base 110-1, first sensing patterns 120 plated on the first pattern grooves 111, second sensing patterns 140 plated on the second pattern grooves 112, a first painting layer 150-1 coated on one surface of the base 110-1, and a second painting layer 150-2 coated on the other surface of the base 110-1.

The touch input device 100-1 according to the second embodiment of the present disclosure may form the first sensing patterns 120 and the second sensing patterns 140 on both sides of the base, respectively. That is, since only one base 110-1 is used to form the two-layer sensing patterns, the thickness of the touch input device 100 may be reduced and a slim product may be made.

The connection portions 20 for connecting the sensing patterns 120 and 140 and the wirings 30 may be formed on one surface of the base 110-1. To this end, either the first sensing patterns 120 or the second sensing patterns 140 may extend to the opposite surface of the base 110-1 and be connected to the connection portions 20.

FIG. 13 is a flowchart showing a manufacturing method of the touch input device 100-1 according to the second embodiment of the present disclosure.

The manufacturing method of the touch input device 100-1 according to the second embodiment of the present disclosure is as follows: first, the base 110-1 is prepared (S200); the first pattern grooves 111 are processed on one surface of the base 110-1 (S210); the first sensing patterns 120 are formed on the first pattern grooves 111 by plating (S220); the base 110-1 is turned upside down and the second pattern grooves 112 are processed on the rear surface of the base 110-1 (S230); the second sensing patterns 140 are formed on the second pattern grooves 112 by plating (S240); the first painting layer 150-1 is stacked on one surface of the base 110-1 to protect the first sensing patterns 120 (S260); and the second painting layer 150-2 is stacked on the other surface of the base 110-1 to protect the second sensing patterns 140 (S270).

Alternatively, the process S210 of processing the first pattern grooves 111 on one surface of the base 110-1 and the process S230 of processing the second pattern grooves 112 on the rear surface of the base 110-1 may be performed simultaneously or continuously. Further, the process S220 of plating the first sensing patterns 120 and the process S240 of plating the second sensing patterns 140 may be performed simultaneously or continuously.

The inspection process S250 of inspecting whether the first sensing patterns 120 and the second sensing patterns 140 operate in normal may be performed before the first and second painting layers 150 are stacked (S260, S270).

Figure 14:
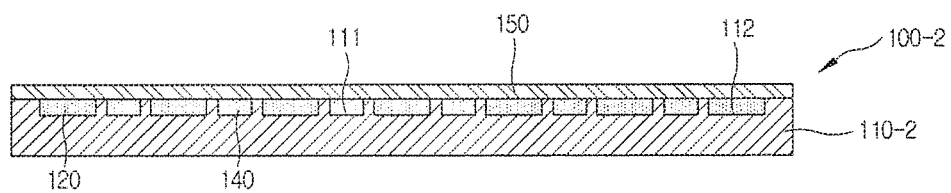
FIG. 14 is a cross-sectional view showing a touch input device according to a third embodiment of the present disclosure.

FIG. 14 is a cross-sectional view showing a touch input device 100-2 according to a third embodiment of the present disclosure.

Referring to FIG. 14, the touch input device 100-2 according to the third embodiment of the present disclosure comprises a base 110-2, first pattern grooves 111 and second pattern grooves 112 formed on one surface of the base 110-2, first sensing patterns 120 plated on the first pattern grooves 111, second sensing patterns 140 plated on the second pattern grooves 112, and a painting layer 150 coated on one surface of the base 110-2.

The touch input device 100-2 according to the third embodiment of the present disclosure may form both the first sensing patterns 120 and the second sensing patterns 140 on one side of the base 110-2. That is, since only one base 110-2 is used to form the two-layer sensing patterns, the thickness of the touch input device 100 may be reduced and a slim product may be produced.

The first sensing patterns 120 and the second sensing patterns 140 are not connected to each other but are spaced apart by a certain distance. The first sensing patterns 120 and the second sensing patterns 140 may form patterns so as not to intersect with each other. The shape of the patterns may be variously provided.

Alternatively, the first sensing patterns 120 and the second sensing patterns 140 may be patterned so as to intersect with each other, and a relay electrode (not shown) may be used to prevent the first and second sensing patterns 120 and 140 from contacting each other at the intersections.

Figure 15:
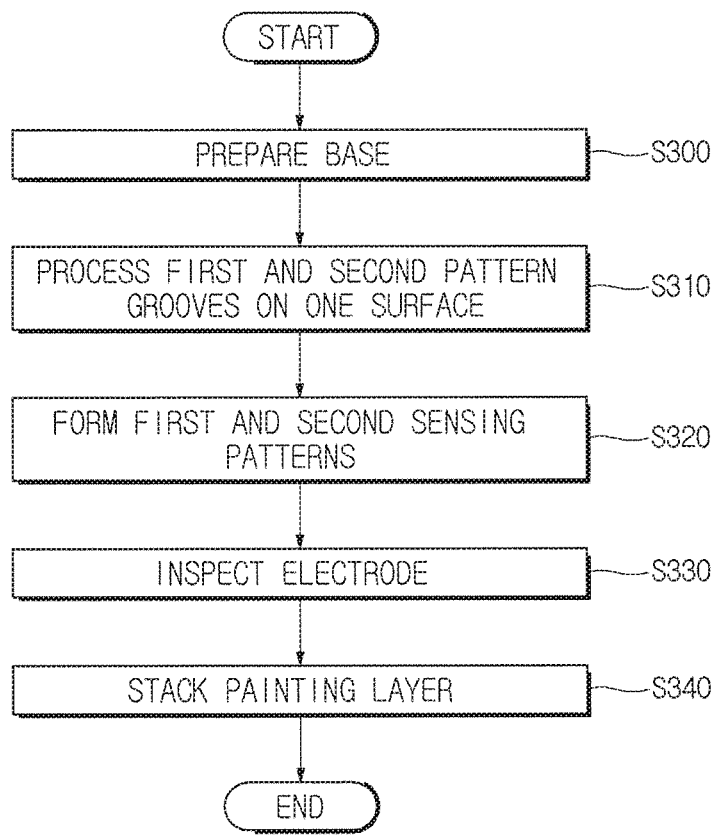
FIG. 15 is a flowchart illustrating a method of manufacturing the touch input device according to the third embodiment of the present disclosure.

FIG. 15 is a flowchart showing a manufacturing method of the touch input device 100-2 according to the third embodiment of the present disclosure.

The manufacturing method of the touch input device 100-2 according to the third embodiment of the present disclosure is as follows: first, the base 110-2 is prepared (S300); the first pattern grooves 111 and the second pattern grooves 112 are processed on one surface of the base 110-2 (S310); the first sensing patterns 120 are formed on the first pattern grooves 111 by plating, and the second sensing patterns 140 are formed on the second pattern grooves 112 by plating (S320); and the painting layer 150 is stacked on one surface of the base 110-2 to protect the first and second sensing patterns 120 and 140 (S340).

The inspection process S330 of inspecting whether the first sensing patterns 120 and the second sensing patterns 140 operate in normal may be performed before the painting layer 150 is stacked (S340).

Figure 16:
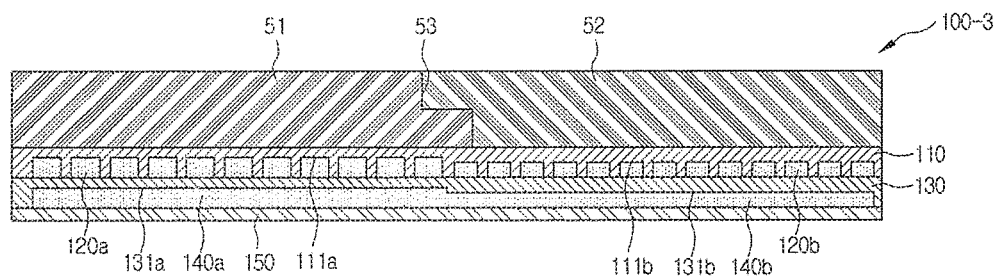
FIG. 16 is a cross-sectional view showing a touch input device according to a fourth embodiment of the present disclosure.

FIG. 16 is a cross-sectional view showing a touch input device 100-3 according to a fourth embodiment of the present disclosure.

The touch input device 100-3 according to the fourth embodiment of the present disclosure may be provided on the bottom surface of the parent materials 51 and 52 provided with various materials. That is, the user may input the touch signal to the touch input device 100-3 by touching the parent materials 51 and 52.

The parent materials 51 and 52 may be made of a non-conductive material. As an example, the parent materials 51 and 52 may include resin, glass, leather, or the like. Further, the parent material 51 and 52 may have a relatively thin thickness. The thicknesses of the parent materials 51 and 52 may be set within a range in which a change in the mutual capacitance of the first and second sensing patterns 120 and 140 provided on the rear surfaces of the parent materials 51 and 52 may occur when the human touches the parent materials 51 and 52 with a finger.

The usability of the touch input device may be increased by coupling the first and second bases 110 and 130, on which the first and second sensing patterns 120 and 140 are formed, to the parent materials 51 and 52. First, by attaching the first base 120 to the parent materials 51 and 52 provided with various materials, the material selection of the parent materials 51 and 52 may be varied. Further, by using a coating process for attaching the first base 120 to the parent materials 51 and 52, the durability against heat, vibration and the like may be improved.

For example, when the touch input device according to the embodiment of the present disclosure is used in a vehicle, the usability is very high. As an example, the touch input device may be installed in a gear box and operated as a central control system, or may be provided in a handle, a door trim, a ceiling, a glass, a pillar or the like to replace a physical button.

The parent materials 51 and 52 may have stiff or elastic surfaces. The parent materials 51 and 52 may be rigid and not deformed, or may be flexible. Further, the parent materials 51 and 52 may be formed by an injection molding method.

The parent materials 51 and 52 may be provided by bonding different kinds of materials. That is, the first parent material 51 and the second parent material 52 may be bonded to each other. In the case of a vehicle as an example, internal devices are provided by bonding various materials to each other. For example, the resin and glass may be bonded together, or different kinds of resins may be bonded together.

By providing the touch pad by bonding different materials as described above, the beauty of the interior may be enhanced. In addition, the user may have a different touch feeling depending on the material. However, when the material of the parent materials 51 and 52 are different from each other, the dielectric constant of the parent material 51 and 52 may be different from each other, which may cause a problem of uniform touch recognition.

The touch input device 100-3 according to the fourth embodiment of the present disclosure may allow the user to perform continuous touch input across a boundary 53 of the different kinds of parent materials 51 and 52. In addition, the touch recognition degree may be made uniform even though the materials of the parent materials 51 and 52 are different from each other. That is, the touch sensitivity when the touch signal is inputted to the first parent material 51 and the touch sensitivity when the touch signal is inputted to the second parent material 52 may be provided equally.

Hereinafter, a description will be done about a method in which the touch input device 100-3 provided at the bottom of the different kinds of parent materials 51 and 52 provides a uniform touch to the user.

Surfaces of the first parent material 51 and the second parent material 52 may be bonded to each other. At this time, in order to increase the bonding force, the vertical cross section of the joint portion may be provided in a stepped shape. The first and second parent materials 51 and 52 may be provided at the same height. Therefore, the upper surfaces of the first and second parent materials 51 and 52 form the same plane, and also the bottom surfaces of the first and second parent materials 51 and 52 may form the same plane.

The first base 110 may be coated and attached to the bottoms of the first and second parent materials 51 and 52. The first base 110 may cover the boundary 53 between the first and second parent materials 51 and 52. That is, the first base 110 may integrally include the bottom of the first and second parent materials 51 and 52.

The first pattern grooves 111 may be formed on the bottom surface of the first base 110. The first pattern grooves 111 may include a plurality of patterns arranged in one direction.

In addition, the first pattern grooves 111 may have different widths or depths depending on the dielectric constants of the parent materials 51 and 52. In order to uniformly provide a sense of touch on the touch surface in the touch input device of the capacitive type, the amount of change of the capacitance needs to be constant according to the area of contact with the input means of the user.

The amount of change in the electrostatic capacitance means the degree to which the capacitance after the user's input means has contacted is reduced relative to the capacitance before the user's input means contacts. This is because the electrostatic capacitance reduced as the input means of the user touches the charges is lost through the parent materials 51 and 52 and the input means of the user.

The formula for the electrostatic capacitance is given below.

$$C = \varepsilon \frac{S}{d} (C: \text{electrostatic capacitance, } \varepsilon: \text{dielectric constant,}$$
$$s: \text{width of electrode, } d: \text{distance between electrode and input means)}$$

In the above formula, the dielectric constant depends on the dielectric constants of the parent materials 51 and 52.

Referring to the above formula, it can be seen that as the dielectric constants of the parent materials 51 and 52 increase, as the widths of the sensing patterns 120 and 140 increase, or as the distance between the surfaces of the parent materials 51 and 52 and the sensing patterns 120 and 140 decreases, the electrostatic capacitance increases. Here, the distance between the surfaces of the parent materials 51 and 52 and the sensing patterns 120 and 140 decreases as the depths of the pattern grooves 111 and 131 become deeper.

When the absolute value of the capacitance is increased, the amount of change of the capacitance is also increased. Accordingly, in order to match the amounts of change in capacitance in the different kinds of parent materials 51 and 52 having different dielectric constants, the widths of the sensing patterns 120 and 140 disposed under the different kinds of parent materials 51 and 52 need to be different from each other, or the depths of the pattern grooves 111 and 131 need to be different from each other.

Assuming that the dielectric constant of the first parent material 51 is smaller than the dielectric constant of the second parent material 52, if the widths of the first sensing patterns 120a and 120b disposed under the first parent material 51 and the second parent material 52 are made to be the same and the distance from the first sensing patterns 120a and 120b to the first parent material 51 or the second parent material 52 are made to be the same, the amount of change in the capacitance of the first parent material 51 is smaller than the amount of change in the capacitance of the second parent material 52. As a result, the touch sensitivity in the first parent material 51 and the touch sensitivity in the second parent material 52 are different from each other.

In the embodiment of the present disclosure, the width of the first sensing patterns 120a provided under the first parent material 51 is set larger than the width of the first sensing patterns 120b provided below the second parent material 52, and thus, the change in the electrostatic capacitance generated in the first parent material 51 may be made constant with the change in the electrostatic capacitance generated in the second parent material 52.

Alternatively, the depth of first pattern grooves 111a provided below the first parent material 51 is set greater than the depth of first pattern grooves 111b provided below the second parent material 52, and thus the change in the electrostatic capacitance generated in the first parent material 51 may be made constant with the change in the electrostatic capacitance generated in the second parent material 52. This is because the distance between the first sensing patterns 120*a* and 120*b* and the input means decreases as the depth of the first pattern grooves 111*a* and 111*b* increases.

Although the boundary 53 between the first parent material 51 and the second parent material 52 is provided as a step shape instead of a line in the vertical cross-sectional direction in the drawing, the shapes of the first sensing patterns 120*a* and 120*b* are not changed, in consideration of the amount of change in the capacitance at the boundary 53. This is because the width of the boundary 53 where the first parent material 51 and the second material 52 overlap is not much different from the interval of the adjacent first sensing patterns 120.

However, if the width of the boundary 53 where the first parent material 51 and the second parent material 52 overlap is larger than a reference width of the adjacent first sensing patterns 120, the change of dielectric constant in the boundary 53 needs to be considered. That is, since the dielectric constant in the boundary 53 where the first parent material 51 and the second parent material 52 overlap is about halfway between the dielectric constant in the first parent material 51 and the dielectric constant in the second parent material 52, the width of the first sensing patterns 120 under the boundary 53 may be provided to be about the middle of the width of the first sensing patterns 120*a* under the first parent material 51 and the width of the first sensing patterns 120*b* under the second parent material 52. Or the depth of the first pattern grooves 111 under the boundary 53 area may be provided to be about the middle of the depth of the first pattern grooves 111*a* under the first parent material 51 and the depth of the first pattern grooves 111*b* under the second parent material 52.

FIGS. 17 to 24 schematically show a manufacturing method of a touch input device 100-3 according to a fourth embodiment of the present disclosure.

Figure 17:
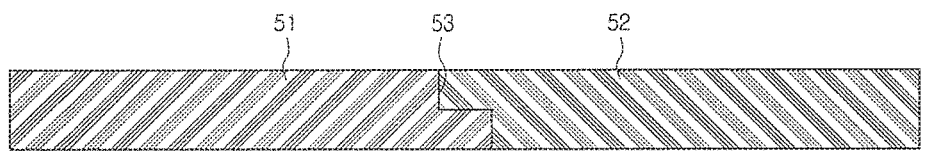

FIG. 17 shows a process of preparing the different kinds of parent materials 51 and 52. The first parent material 51 and the second parent material 52 may be made of different materials. The first parent material 51 and the second parent material 52 may be bonded together in a bonding manner or the like. Here, the boundary 53 between the first parent material 51 and the second parent material 52 may be stepped in the vertical cross-sectional direction to increase the bonding force.

Further, the first parent material 51 and the second parent material 52 may have the same thickness. Particularly, the bottom surfaces of the first parent material 51 and the second parent material 52 may form the same plane.

Figure 18:
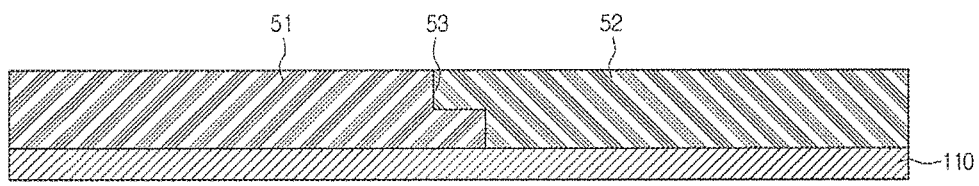

FIG. 18 is a view showing a process of stacking the first base 110. The first base 110 may be coated on the bottom surfaces of the first and second parent materials 51 and 52. The first base 110 may comprise a metal complex. In addition, the first base 110 may have a constant thickness.

Figure 19:
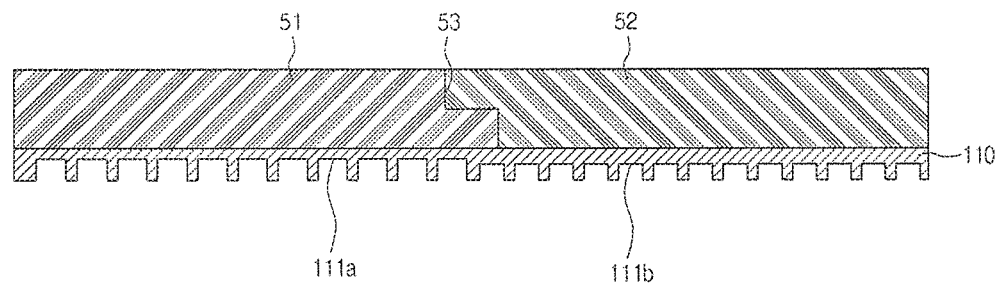

FIG. 19 is a view showing a process of processing the first pattern grooves 111. The first pattern grooves 111 may be formed by irradiating a laser. At this time, the heat generated as the grooves are formed disintegrates the chemical bonds of the metal complex to restore them to metal, and forms a metal seed in the first pattern grooves 111.

Further, at least one of the width and the depth of the first pattern grooves 111*a* and *b* may be formed differently in a region located under the first parent material 51 and a region located under the second parent material 52. In addition, any one of the width and depth of the first pattern grooves 111 may be formed differently in a region where the first parent material 51 and the second parent material 52 overlap.

Figure 20:
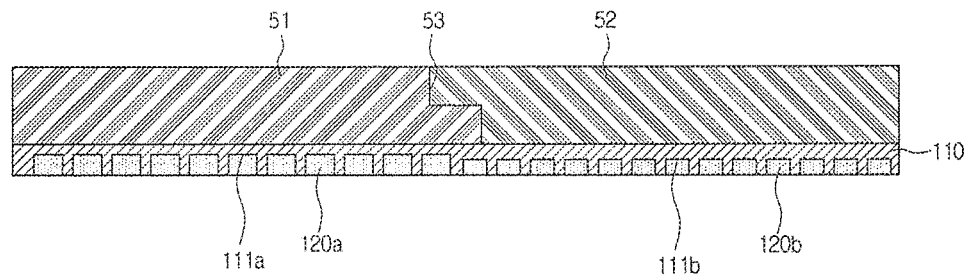

FIG. 20 is a view showing a process of forming the first sensing patterns 120. The first sensing patterns 120 may be formed by metallizing the first pattern grooves 111 in which a metal seed is exposed. For example, the first sensing patterns 120 include copper plated on the first pattern grooves 111. Further, nickel may be plated on the copper plating to prevent oxidation.

Figure 21:
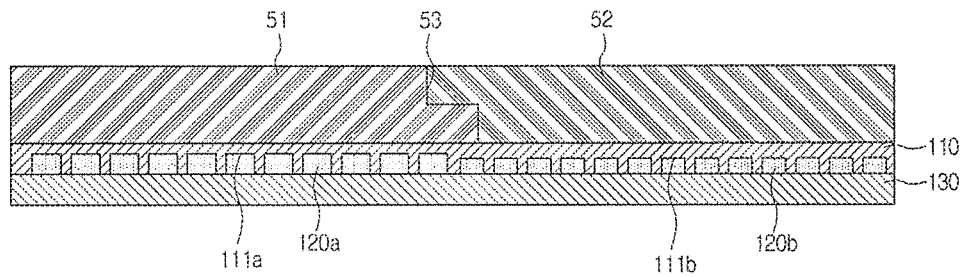
Figure 22:
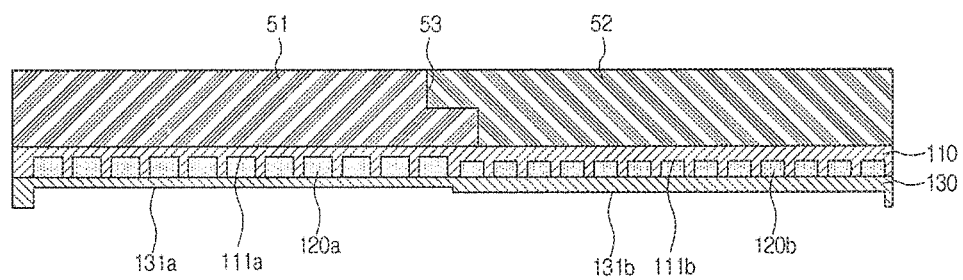
Figure 23:
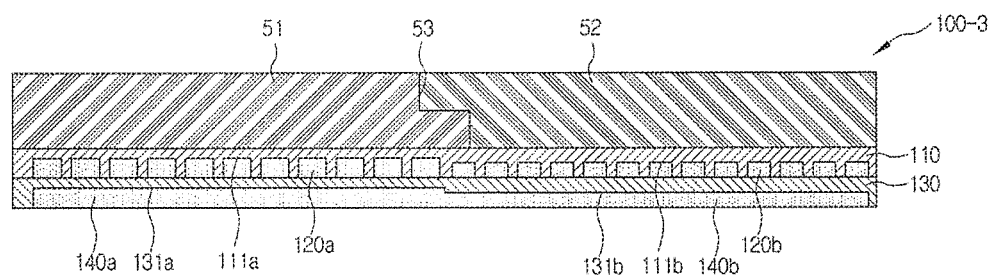

FIG. 21 shows a process of stacking the second base, FIG. 22 shows a process of processing the second pattern grooves, and FIG. 23 shows a process of forming the second sensing patterns.

The second base 130 may be formed of a metal complex and form by being coated on the bottom surface of the first base 110. Further, the second base 130 may have a constant thickness.

The description of FIGS. 18 to 20 may be applied to the processes shown in FIGS. 21 to 23, and thus, redundant description will be omitted.

Figure 24:
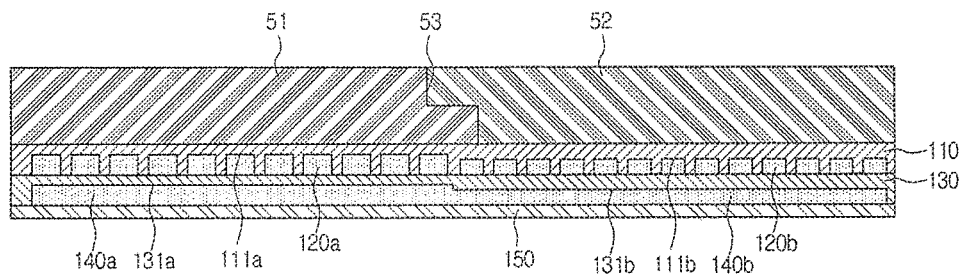

FIG. 24 is a view showing a process of stacking the painting layer 150. The painting layer 150 may be coated on the second base 130 to protect the second sensing patterns 140 from external shocks or contaminants. The painting layer 150 may be formed by UV painting or UV coating using an ultraviolet screening agent.

Figure 25:
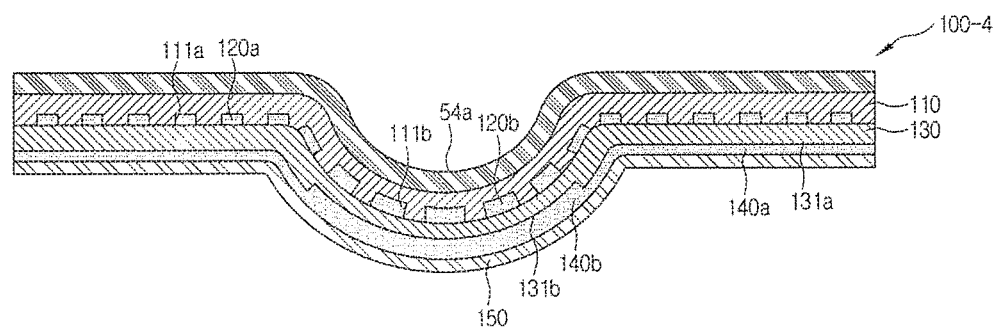
FIG. 25 is a cross-sectional view illustrating a touch input device according to a fifth embodiment of the present disclosure.

FIG. 25 is a sectional view showing a touch input device 100-4 according to a fifth embodiment of the present disclosure.

Figure 26:
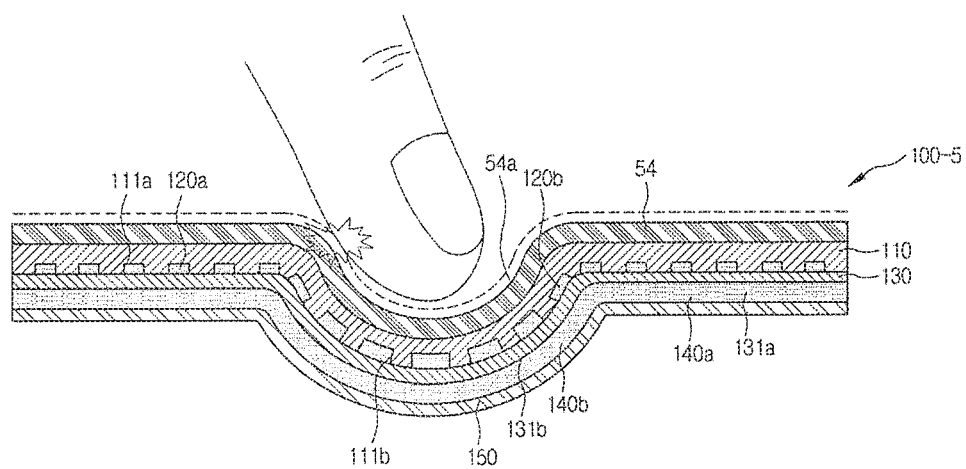
FIG. 26 is a view showing a malfunction state when the resistance values are made constant according to the curvatures.

The touch input device 100-4 according to the fifth embodiment of the present disclosure may be provided on the bottom surface of a parent material 54 including a concave portion (see also FIG. 26).

It has been described above that the parent material 54 may have various shapes. In a case that the parent material 54 has a gentle curvature, there is little possibility that a touch malfunction occurs when the user touches the parent material 54. However, in a case that the bending of the parent material 54 is abrupt, for example, when the depressed concave portion 54*a* is included as shown in the drawing, the touch malfunction may occur unlike the user's intention.

Here, the case that a malfunction of the touch occurs means that the touch is recognized as touching another point even though the user does not touch the intended point. Such a malfunction is likely to occur when the touch input device 100 allows indirect contact as well as direct contact, that is, when the touch input device 100 has a hovering function.

A method of preventing a touch malfunction by the touch input device 100-4 according to the fifth embodiment of the present disclosure shown in FIG. 27 through a comparative example 100-5 of FIG. 26 will be described.

Figure 27:
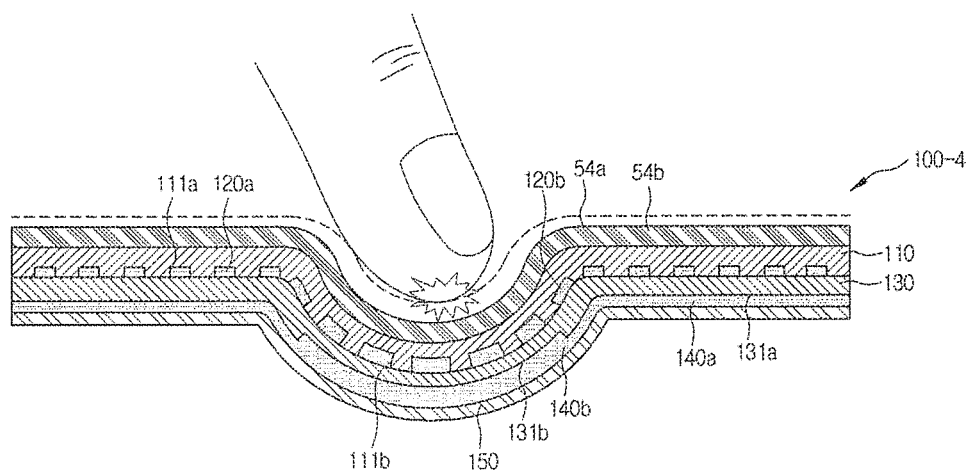
FIG. 27 is a view showing an operating state when the resistance values are made changed according to the curvatures.

FIG. 26 is a view showing a malfunction state when the resistance values of the sensing patterns 120 and 140 are made constant according to the curvatures of the parent material 54, and FIG. 27 is a view showing an operating state when the resistance values of the sensing patterns 120 and 140 are made changed according to the curvatures of the parent material 54.

Referring to FIG. 26, in a case that the shapes of the first sensing patterns 120 and the second sensing patterns 140 are consistently formed along the curved surface of the parent material 54, it can be seen that the hovering heights (indicated by a dotted line in the figure) of recognizing the indirect touch are consistently formed along the curved surface of the parent material 54.

In a case that the user intends to touch the valley, which is the lowest point of the concave portion 54a of the parent material 54, and brings a finger close to the valley, if the other part of the finger invades the hovering height even though the end of the finger does not touch the valley, the touch input device 100-5 may mistakenly recognize that the user has touched another area.

Referring to FIG. 27, in order to solve such a problem, the touch input device 100-4 according to the fifth embodiment of the present disclosure may change resistances of the first sensing patterns 120 and the second sensing patterns 140 differently according to the curved shape of the parent material 54.

The formula for the magnitudes of resistances of the sensing patterns 120 and 140 for determining touch sensitivity or height of hovering in the capacitive touch input device is as follows.

$$R = \rho \frac{\lambda}{S} (R: \text{resistance}, \rho: \text{resistivity}, \lambda: \text{length of resistance},$$

$S$ : cross-sectional area of resistance)

In the above formula, the length of the resistance means the length of the sensing patterns 120 and 140. However, the lengths of the sensing patterns 120 and 140 vary depending on the area of the touch surface and may not be arbitrarily adjusted. In addition, the cross-sectional area of the resistance means the vertical cross-sectional area of the sensing patterns 120 and 140. That is, the width and height of the sensing patterns 120 and 140 may be adjusted to vary the cross-sectional area of the resistance.

For example, it can be seen that as the width of the sensing patterns 120 and 140 is increased, or as the height of the sensing patterns 120 and 140 is increased, the resistance is reduced. In addition, if the resistance of the sensing patterns 120 and 140 is reduced, the hovering height for recognizing an indirect touch is relatively increased. In contrast, as the width of the sensing patterns 120 and 140 are decreased, or as the height of the sensing patterns 120 and 140 is decreased, the resistance is increased and the hovering height for recognizing an indirect touch is relatively lowered.

The sensitivity of the touch recognition in the touch input device of the capacitive type may be expressed by a formula representing the time constant in the series circuit of the capacitor and the resistance as follows.

Time constant(tau)=resistance($R$)*Capacitor($C$)

Here, the resistance is the value of the surface of the touch portion, and the capacitor means the amount of change caused by the touch of the user. In other words, if the resistance value is increased, the time for detecting the touch recognition is delayed and the sensitivity is lowered. Conversely, if the resistance value is decreased, the touch recognition may be detected quickly. In the present disclosure, to use the above-mentioned physical laws, the resistance value is changed according to the curvature, thereby reducing the erroneous recognition and sensing the touch of the same performance.

That is, referring to FIG. 27, in the concave portion 54a of the parent material 54, the hovering height is increased by lowering the resistance of the sensing patterns 120 and 140. Thus, during the movement of the finger to the point intended by the user, the finger does not hit the hovering height of the other point, but touches the hovering height at the intended point.

In addition, touch recognition may be speeded up by lowering the resistance of the sensing patterns 120 and 140 in the concave portion 54a of the parent material 54. Therefore, in a case that the finger reaches the hovering height of the intended point after the finger hits the hovering height of the other point while the finger is moving to the intended point, the touch recognition is delayed since touch sensitivity is low at a point where the resistance is high, as a result of the touch sensitivity is increased at a point where the resistance is low, the touch recognition may be performed in accordance with the user's intention.

That is, even in a place where the shape of the parent material 54 including inflection points or the like is complicated, a sensitive touch is possible.

FIGS. 25 to 27 illustrate that the bases 110 and 130 are disposed under the parent material 54, but the patent material 54 may be omitted in the embodiment of the present disclosure, unlike the drawings. That is, one surface of the bases 110 and 130 may be provided as a touch surface.

In addition, the pattern grooves 111 and 131 may be formed on the upper surfaces of the bases 110 and 130 or on the lower surfaces of the bases 1110 and 130. For example, the first pattern grooves 111 and the second pattern grooves 131 may be formed on the upper surfaces of the first base 110 and the second base 130, respectively, or the first pattern grooves 111 and the second pattern grooves 131 may be formed on the lower surfaces of the first base 110 and the second base 130, respectively.

The first pattern grooves 111 and the second pattern grooves 131 may be formed on the other surfaces of the first and second bases 110 and 130, respectively. For example, the first pattern grooves 111 may be formed on the upper surface of the first base 110, and the second pattern grooves 131 may be formed on the lower surface of the second base 130, or vice versa.

Although the first and second bases 110 and 130 are stacked in a two-layer structure in FIGS. 25 to 27, the first and second sensing patterns 120 and 140 may be formed on one base. For example, the first sensing patterns 120 may be formed on one surface of the base, and the second sensing patterns 140 may be formed on the other surface of the base. That is, the first and second sensing patterns 120 and 140 may have a double-surface structure. The first and second sensing patterns 120 and 140 may be formed on the same surface of the base, that is, the first and second sensing patterns 120 and 140 may have a one-surface structure.

While the present disclosure has been particularly shown and described with reference to exemplary embodiments thereof, it is clearly understood that the same is by way of illustration and example only and is not to be taken by way of limitation. Accordingly, it will be understood that the true scope of the present disclosure should be determined only by the appended claims.

The invention claimed is:

1. A touch input device comprising:
a touch portion having a concave portion and receiving a touch signal of a user;
a parent material on which the touch portion is disposed;
a base integrally combined with the touch portion or disposed at a lower side of the touch portion, the base having pattern grooves in an area corresponding to the touch portion; and
sensing patterns comprising a conductive material and arranged on the pattern grooves, wherein the sensing patterns located at a lower side of the concave portion have a resistance smaller than that of the sensing patterns located at an outer side of the concave portion, and wherein the base comprises:
  a first base disposed at a lower side of the parent material; and
  a second base disposed at a lower side of the first base, and wherein the pattern grooves and the sensing patterns include:
  first pattern grooves and first sensing patterns formed on one surface of the first base; and
  second pattern grooves and second sensing patterns formed on one surface of the second base.

2. The touch input device according to claim 1, wherein the sensing patterns located at the lower side of the concave portion have a vertical cross-sectional width greater than that of the sensing patterns located at the outer side of the concave portion.

3. The touch input device according to claim 1, wherein the base comprises:
  a resin including at least one of polycarbonate (PC), polyamide (PA), and acrylonitrile-butadiene-styrene copolymer (ABS); and
  a metal oxide including at least one of Mg, Cr, Cu, Ba, Fe, Ti, and Al.

4. The touch input device according to claim 1, wherein the base is coated on a bottom surface of the parent material.

5. The touch input device according to claim 4, wherein the parent material is at least one of resin, glass, and leather.

6. A vehicle comprising a touch input device according to claim 1.

7. The vehicle according to claim 6, wherein the touch input device is installed in a centralized operating system of a gear box.

* * * * *